(12) United States Patent
Song et al.

(10) Patent No.: US 12,407,926 B2
(45) Date of Patent: Sep. 2, 2025

(54) METHOD AND ELECTRONIC DEVICE FOR IMAGE STABILIZATION DURING IMAGE CAPTURING USING MOTION DATA

(71) Applicant: SAMSUNG ELECTRONICS CO., LTD., Suwon-si (KR)

(72) Inventors: Wonseok Song, Suwon-si (KR); Jaemu Yun, Suwon-si (KR); Junghwan Jo, Suwon-si (KR); Kyoungho Yun, Suwon-si (KR); Seungtae Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/458,558

(22) Filed: Aug. 30, 2023

(65) Prior Publication Data

US 2023/0412924 A1 Dec. 21, 2023

Related U.S. Application Data

(63) Continuation of application No. PCT/KR2022/005321, filed on Apr. 13, 2022.

(30) Foreign Application Priority Data

Apr. 22, 2021 (KR) .......................... 10-2021-0052412

(51) Int. Cl.
H04N 23/68 (2023.01)
(52) U.S. Cl.
CPC ....... *H04N 23/684* (2023.01); *H04N 23/6812* (2023.01); *H04N 23/687* (2023.01)
(58) Field of Classification Search
CPC ............ H04N 23/684; H04N 23/6812; H04N 23/687; H04N 5/06; H04N 5/14;
(Continued)

(56) References Cited

U.S. PATENT DOCUMENTS 10,148,880 B2 12/2018 Pettersson
10,348,969 B2 7/2019 Murakami et al.
(Continued)

FOREIGN PATENT DOCUMENTS

JP 6700944 B2 5/2020
KR 20180015549 A 2/2018
(Continued)

OTHER PUBLICATIONS

International Search Report for PCT/KR2022/005321 mailed Jul. 27, 2022, 4 pages.
(Continued)

*Primary Examiner* — Padma Haliyur
(74) *Attorney, Agent, or Firm* — Nixon & Vanderhye, P.C.

(57) ABSTRACT

An electronic device according to an embodiment of the present disclosure may comprise: a camera module including an OIS actuator and an image sensor for performing read-out of an image frame acquired through image stabilization by the OIS actuator; at least one motion sensor; and at least one processor. The at least one processor may be configured to: acquire a first read-out image frame through the image sensor; acquire a first vertical synchronization signal (Vsync) corresponding to the first image frame from the image sensor; acquire multiple pieces of motion data of the electronic device through the at least one motion sensor during the read-out of the first image frame; determine (identify) first motion data corresponding to a first time point at which the read-out of the first image frame is completed, on the basis of the first vertical synchronization signal; and perform digital image stabilization (DIS) for the first image frame using the first motion data and at least one piece of second motion data acquired before the first motion data among the multiple pieces of motion data.

14 Claims, 12 Drawing Sheets

(58) Field of Classification Search
CPC .... H04N 23/683; H04N 23/689; H04N 5/144; H04N 25/75
See application file for complete search history.

(56) References Cited

U.S. PATENT DOCUMENTS

| | | | | |
|---|---|---|---|---|
| 2017/0244881 | A1* | 8/2017 | Stec | H04N 23/687 |
| 2017/0251147 | A1* | 8/2017 | Ikeda | H04N 23/681 |
| 2017/0289444 | A1* | 10/2017 | Han | H04N 23/667 |
| 2018/0041704 | A1* | 2/2018 | Jo | H04N 23/6812 |
| 2018/0091739 | A1 | 3/2018 | Murakami et al. | |
| 2019/0260934 | A1* | 8/2019 | Li | H04N 23/687 |
| 2020/0186715 | A1* | 6/2020 | Keal | H04N 23/6812 |
| 2020/0322534 | A1* | 10/2020 | Lee | H04N 23/6812 |
| 2020/0389596 | A1 | 12/2020 | Lee et al. | |
| 2022/0006956 | A1 | 1/2022 | Moon et al. | |

FOREIGN PATENT DOCUMENTS

| | | |
|---|---|---|
| KR | 20180035150 A | 4/2018 |
| KR | 20180081930 A | 7/2018 |
| KR | 20190095795 A | 8/2019 |
| KR | 20200139321 A | 12/2020 |

OTHER PUBLICATIONS

Written Opinion of the ISA for PCT/KR2022/005321 mailed Jul. 27, 2022, 4 pages.

Office Action dated Jun. 18, 2025 in Korean Application No. 10-2021-0052412 and English-language translation.

* cited by examiner

METHOD AND ELECTRONIC DEVICE FOR IMAGE STABILIZATION DURING IMAGE CAPTURING USING MOTION DATA

CROSS-REFERENCE TO RELATED APPLICATIONS

This application is a continuation of International Application No. PCT/KR2022/005321 designating the United States, filed on Apr. 13, 2022, in the Korean Intellectual Property Receiving Office and claiming priority to Korean Patent Application No. 10-2021-0052412, filed on Apr. 22, 2021, in the Korean Intellectual Property Office, the disclosures of each of which are incorporated by reference herein in their entireties.

BACKGROUND

Field

The disclosure relates to a method of performing image stabilization when shooting an image, and an electronic device therefor.

Description of Related Art

An image stabilization function of the camera functions is an important function to obtain a clear picture. Generally, the image stabilization may include optical image stabilization (OIS) and digital image stabilization (DIS). OIS is a scheme of mitigating shaking by moving a lens or an image sensor, and DIS is a scheme that is adopted by a portable terminal and that reduces shaking via digital processing.

In order to smoothly perform the above-described image stabilization, an image sensor included in a portable terminal may synchronize motion data (e.g., OIS data and gyro data) and an image frame, and transfer the same to a processor. In this instance, the image sensor and the OIS module need to be connected and motion data may be continuously transferred to the image sensor. The processor may receive an image frame and motion data together from the image sensor and may perform image stabilization.

To smoothly perform image stabilization, optical image stabilization (OIS) and digital image stabilization (DIS) need to be synchronized. In this instance, to synchronize them, a portable terminal may need to employ an image sensor capable of transferring an image frame and motion data (e.g., OIS data and gyro data) associated with the image frame to a processor together. Therefore, in order to perform video digital image stabilization (VDIS), an electronic device needs to adapt an image sensor equipped with a synchronization function, and thus this may not be generally utilized for various portable terminals, which is a drawback.

SUMMARY

Embodiments of the disclosure may provide an electronic device that transfers motion data synchronized based on a vertical synchronization signal (Vsync) corresponding to an image frame, and performs digital image stabilization (DIS), and a control method of the electronic device.

An electronic device according to an example embodiment of the disclosure may include: a camera module including an optical image stabilization (OIS) actuator and an image sensor configured to read out (read-out) an image frame obtained based on image stabilization being performed via the OIS actuator, at least one motion sensor, and at least one processor operatively connected to the camera module and the at least one motion sensor. The at least one processor may be configured to: obtain a first image frame read out (read-out) via the image sensor, obtain, from the image sensor, a first vertical synchronization signal (Vsync) corresponding to the first image frame, obtain a plurality of pieces of motion data corresponding to a movement of the electronic device via the at least one motion sensor, while the first image frame is read out (read-out), identify, based on the first vertical synchronization signal, first motion data corresponding to a first point in time at which read-out of the first image frame is completed, and perform digital image stabilization (DIS) on the first image frame using at least one piece of second motion data obtained before the first motion data among the plurality of pieces of motion data, and the first motion data.

A method of operating an electronic device according to an example embodiment of the disclosure may include: obtaining a first image frame read out (read-out) via an image sensor, obtaining, from the image sensor, a first vertical synchronization signal (Vsync) corresponding to the first image frame, obtaining, by at least one motion sensor, a plurality of pieces of motion data corresponding to a movement of the electronic device while the first image frame is read out (read-out), identifying, based on the first vertical synchronization signal, first motion data corresponding to a first point in time at which read-out of the first image frame is completed, and performing digital image stabilization (DIS) on the first image frame using at least one piece of second motion data obtained in advance to the first motion data among the plurality of pieces of motion data, and the first motion data.

An electronic device according to an example embodiment of the disclosure may include: a camera module including an optical image stabilization (OIS) actuator and an image sensor, at least one motion sensor, and at least one processor operatively connected to the camera module and the at least one motion sensor and including a kernel, an OIS micro controller unit (OIS MCU), and a hardware abstraction layer (HAL). The at least one processor may be configured to: obtain, from the image sensor, a first image frame on which the OIS actuator performs image stabilization based on the electronic device shaking, the first image frame including a first marker based on a first timer of the kernel, obtain a first vertical synchronization signal corresponding to the first image frame, obtain a plurality of pieces of motion data of the electronic device via the at least one motion sensor while the first image frame is read out, identify, based on the first vertical synchronization signal, first motion data corresponding to a first point in time at which the first image frame is completely read out, and perform digital image stabilization (DIS) on the first image frame using at least one piece of second motion data obtained before the first motion data from among the plurality of pieces of motion data and the first motion data.

According to various example embodiments of the disclosure, an electronic device may accurately apply OIS information when performing VDIS.

In addition, according to various example embodiments, synchronization between an image obtained via an image sensor and motion data may be generally used.

In addition, various effects directly or indirectly recognized from the disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments of the disclosure will be described in greater detail with reference to the accompanying drawings. This is not to limit the disclosure to any specific embodiment, and should be understood that various modifications, equivalents, and/or alternatives of the embodiment of the disclosure are included.

Figure 1:
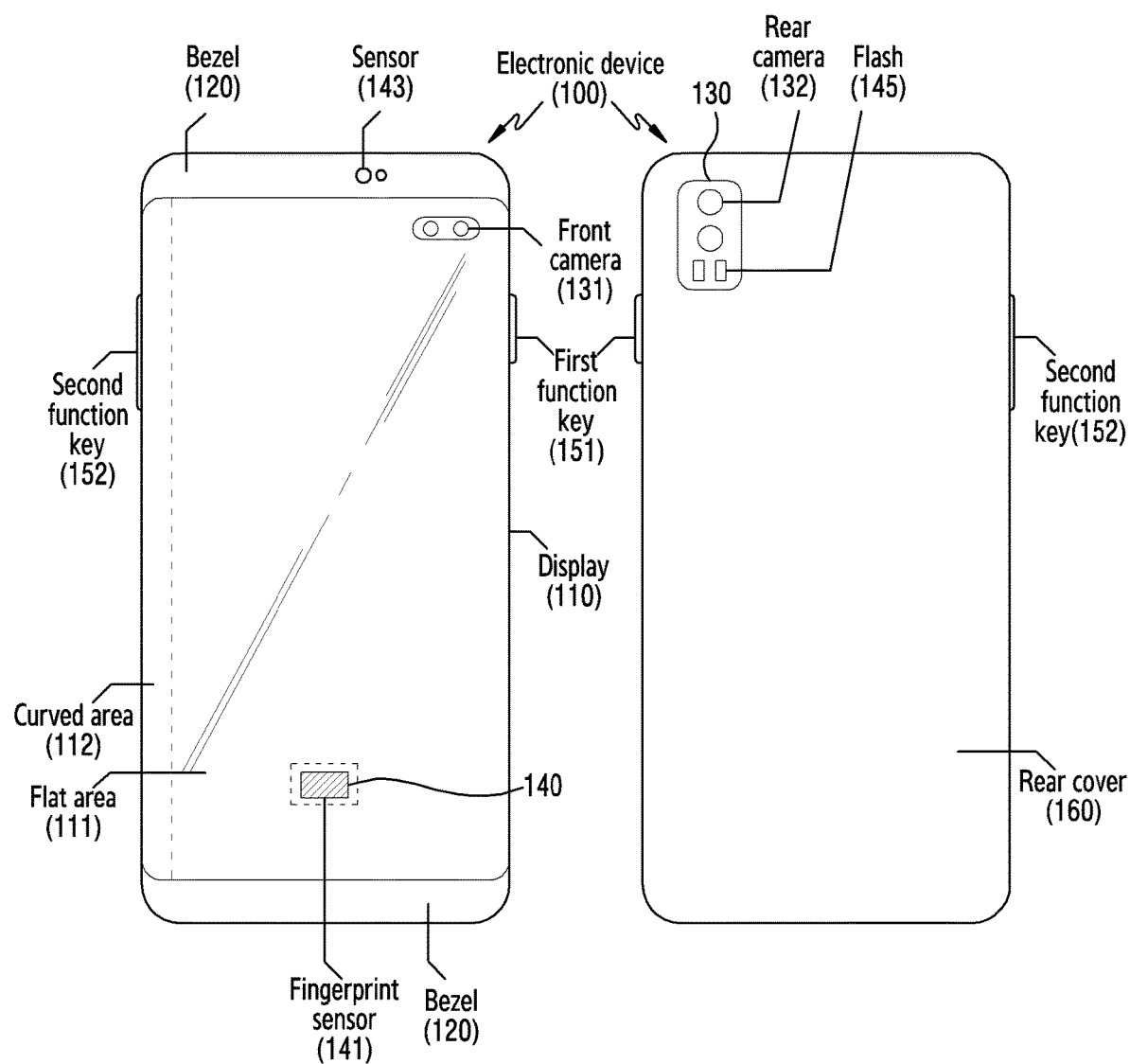
FIG. 1 is a diagram illustrating an example electronic device according to various embodiments.

FIG. 1 is a diagram illustrating an example electronic device 100 according to various embodiments.

Referring to FIG. 1, a display 110 may be disposed in the front side of the electronic device 100 according to an embodiment. According to an embodiment, the display 110 may occupy most of the front side of the electronic device 100. In the front side of the electronic device 100, the display 110 and an area of a bezel 120 that encloses at least part of an edge of the display 110 may be disposed. In the example of FIG. 1, the display 110 may include a flat area 111 and a curved area 112 that extends from the flat area 111 towards a lateral side of the electronic device 100. Although FIG. 1 illustrates the curved area 112 of one side (e.g., the left side), it may be construed that the curved area is also present in the other side. In addition, the electronic device 100 of FIG. 1 is merely an example, and various embodiments thereof may be possible. For example, the display 110 of the electronic device 100 may have only the flat area 111 without the curved area 112, or may have the curved area 112 in one side of the edge, as opposed to both sides of the edge. In addition, according to an embodiment, a curved area may extend toward the rear side of the electronic device 100, and the electronic device 100 may include an additional flat area.

According to an embodiment, a fingerprint sensor 141 for recognizing a fingerprint of a user may be included in the first area 140 of the display 110. The fingerprint sensor 141 may be disposed in a lower layer of the display 110 and may not be seen by a user, or may be disposed so as not to be seen. In addition, an additional sensor for user/biometric authentication, in addition to the fingerprint sensor 141, may be disposed in a partial area of the display 110. According to an embodiment, a sensor for user/biometric authentication 143 may be disposed in one area of the bezel 120. For example, an IR sensor for iris recognition may be exposed via one area of the display 110, or may be exposed via one area of the bezel 120.

According to an embodiment, a front camera 131 may be disposed in the front side of the electronic device 100. Although the embodiment of FIG. 1 illustrates that the front camera 131 is exposed via one area of the display 110, the front camera 131 may be exposed via the bezel 120 in an embodiment.

According to an embodiment, the electronic device 100 may include one or more front cameras 131. For example, the electronic device 100 may include two front cameras such as a first front camera and a second front camera. According to an embodiment, the first front camera and the second front camera may be the same type of camera having identical specifications (e.g., pixels), or the first front camera and the second front camera may be embodied to have different specifications. The electronic device 100 may support a function (e.g., 3D shooting, auto focus, or the like) related to a dual-camera using two front cameras.

According to an embodiment, a rear camera 132 may be disposed in the rear side of the electronic device 100. The rear camera 132 may be exposed via the camera area 130 of a rear cover 160. According to an embodiment, the electronic device 100 may include a plurality of rear cameras disposed in the camera area 130. For example, the electronic device 100 may include two or more rear cameras. For example, the electronic device 100 may include a first rear camera, a second rear camera, and a third rear camera. The first rear camera, the second rear camera, and the third rear camera may have specifications different from each other. For example, the field of view (FOV) of a camera, a pixel, an aperture, whether an optical zoom/digital zoom is supported, whether an image stabilization function is supported, the type and disposition of a lens set included in a camera, and the like may be different for each of the first rear camera, the second rear camera, and/or the third rear camera. For example, the first rear camera may be a normal camera, the second rear camera may be a camera for wide shooting, and the third rear camera may be a camera for telephoto shooting. In the disclosure, the descriptions associated with the function or characteristics of a front camera may be equally applied to a rear camera, and vice versa.

According to an embodiment, various types of hardware devices or sensors that assist shooting, such as a flash 145 or the like, may be additionally disposed in the camera area 130. For example, a distance sensor (e.g., a TOF sensor) for detecting the distance between a subject and the electronic device 100 or the like may be further included.

According to an embodiment, at least one physical key may be disposed in a lateral side of the electronic device 100. For example, a first function key 151 for turning on/off the display 110 or turning on/off the power of the electronic device 100 may be disposed in the right edge of the front side of the electronic device 100. According to an embodiment, a second function key 152 for controlling the volume, the brightness of a screen, or the like of the electronic device 100 may be disposed in the left edge of the front side of the electronic device 100. Furthermore, an additional button or key may be disposed in the front side or the rear side of the electronic device 100. For example, a physical button or a touch button mapped to a predetermined function may be disposed in a lower end area of the bezel 120 of the front side.

The electronic device 100 illustrated in FIG. 1 is merely an example, and does not limit the type of device to which the technical ideal disclosed of the disclosure is applicable. For example, the technical idea disclosed in the disclosure may be applicable to a foldable electronic device that employs the flexible display 110 and a hinge structure and is fordable horizontally or vertically, a tablet, or a laptop.

Hereinafter, for ease of description, various embodiments will be described with reference to the electronic device 100 illustrated in FIG. 1.

Figure 2:
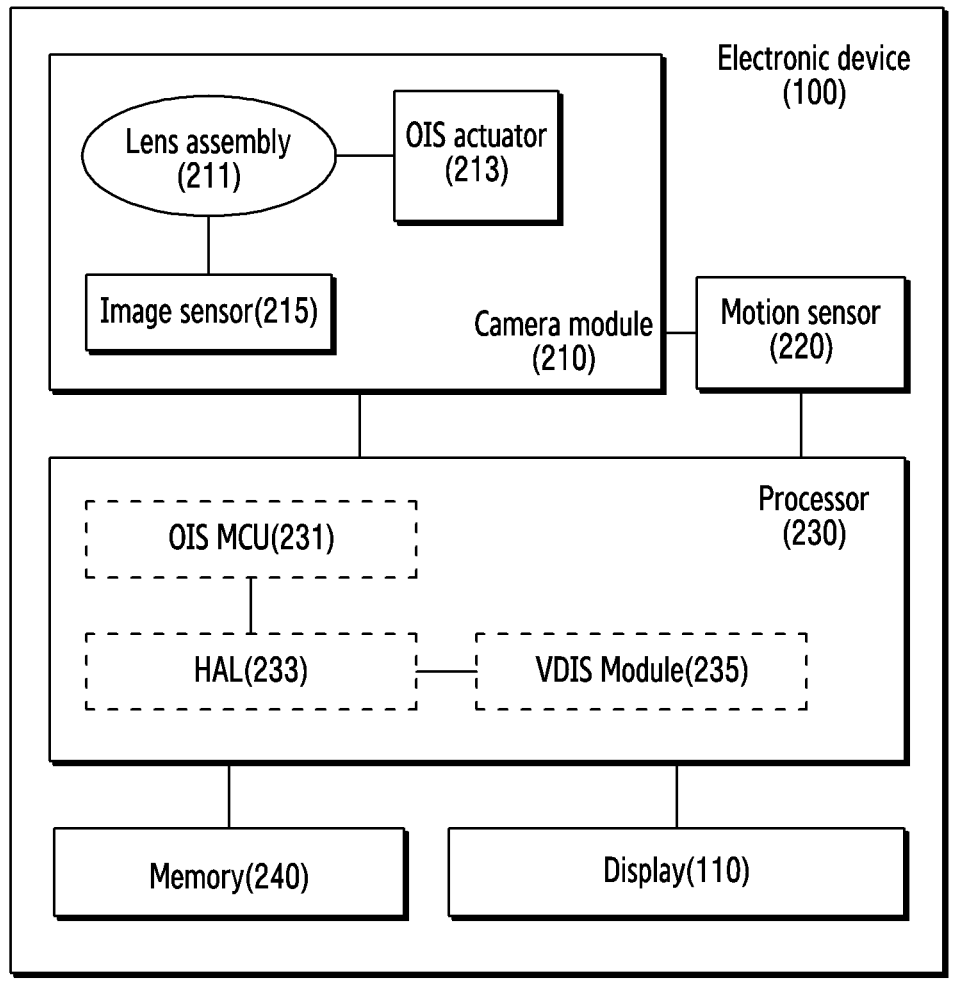
FIG. 2 is a block diagram illustrating an example of controlling a function of performing image stabilization in an electronic device according to various embodiments.

FIG. 2 is a block diagram illustrating various hardware and/or software for performing image stabilization in the electronic device 100 according to various embodiments. In the description of FIG. 2, the configuration and/or function that has been described with reference to FIG. 1 will be briefly described or the description thereof may not be repeated.

Referring to FIG. 2, the electronic device 100 may include a camera module (e.g., including a camera) 210, at least one motion sensor 220, at least one processor (e.g., including processing circuitry) 230, a memory 240, and the display 110.

According to an embodiment, the camera module 210 may include a lens assembly 211, an OIS actuator 213, and an image sensor 215. The camera module 210 may be configured with at least one module included in the electronic device 100. The camera module 210 may correspond to the front camera 131 and/or the rear camera 132 of FIG. 1. The lens assembly 211 may collect light reflected from a subject, and may transfer the light to the image sensor 215. The camera module 210 may convert the light collected via the lens assembly 211 into an electrical signal using the image sensor 215, and may obtain an image frame.

According to an embodiment, in case that the electronic device 100 shakes while the camera module 210 obtains an image frame, the camera module 210 may perform optical image stabilization (OIS) using the OIS actuator 213 in order to perform compensation associated with shaking of the electronic device 100. For example, the camera module 210 may perform OIS according to a lens shift scheme since the OIS actuator 213 is operatively connected to the lens assembly 211. As another example, the OIS actuator 213 may perform OIS according to a sensor shift scheme by moving the image sensor 215. According to an embodiment, the processor 230 may produce an OIS control value in order to perform compensation associated with a movement such as shaking of a hand of a user of the electronic device 100. The OIS actuator 213 may implement OIS by transferring an electric signal corresponding to the OIS control value to an OIS actuating coil operatively connected to the lens assembly 211.

According to an embodiment, the at least one processor 230 may include an application processor (AP). The at least one processor 230 may include an image signal processor (ISP). An image signal processor may be included in an application processor, or may be implemented as separate hardware.

According to an embodiment, referring to FIG. 2, the electronic device 100 may use a hardware and/or software module to support functions to perform image stabilization. For example, the camera module 210 may operate the OIS actuator 213 in order to perform optical image stabilization. For example, the processor 230 may operate an OIS micro controller unit (MCU) 231, a hardware abstraction layer (HAL) 233, and/or a video digital image stabilization (VDIS) module 235 in order to perform digital image stabilization. In various embodiments, a software module different from the software module illustrated in FIG. 2 may be embodied. For example, at least two modules may be integrated into a single module, or a single module may be divided into two or more modules. In addition, a hardware module and a software module share a single function and may increase the performance of a task. For example, the electronic device 100 may include both an encoder embodied as hardware and an encoder embodied as software, and part of data obtained via at least one camera module may be processed by the hardware encoder and the remaining part may be processed by the software encoder.

According to an embodiment, the display 110 may display, in the display 110, an execution screen of an application executed by the processor 230 or contents such as image and/or video stored in the memory 240. In addition, the processor 230 may display, in the display 110, an image frame obtained via the camera module 210 in real time. The display 110 may output, as a preview image, a preview area cropped and/or resized to be appropriate for the resolution of a current preview image.

According to an embodiment, the processor 230 may provide a user interface (UI)/graphic UI (GUI) associated with a camera to a user via the display 110. In addition, a shooting operation may be controlled in response to a user input provided via a UI/GUI output to the display 110. For example, the processor 230 may obtain a recoding start/stop input from a user, and may transfer the obtained recording start/stop input to an encoder. An input obtained from the user may include an input obtained via a voice recognition function or detection of a predetermined gesture.

According to an embodiment, the processor 230 (e.g., an image signal processor) may perform stabilization on image frames obtained from the camera module 210. According to an embodiment, stabilization may include at least one of an auto exposure (AE), an auto focus (AF), and an auto white balance (AWB). In addition, the processor 230 (e.g., an image signal processor) may increase the quality of an obtained image by appropriately adjusting/tuning image quality, in addition to performing the AE, AF, and/or AWB, or may apply a desired effect to the obtained image.

In an embodiment, the electronic device 100 may use one or more hardware processing circuits in order to implement various functions and operations disclosed in the disclosure. For example, an application processor (AP) included in a mobile device, an image signaling processor (ISP) contained in a camera module, a DDIC (display driver integrated circuits), a touch IC, a communication processor (CP), a hardware encoder, and the like may be used for implementing various embodiments disclosed. The connection relationship between the hardware/software illustrated in FIG. 2 is for ease of description and does not limit the flow/direction of data or commands. The component elements included in the electronic device 100 may have various electrical/operative connection relationships.

Figure 3:
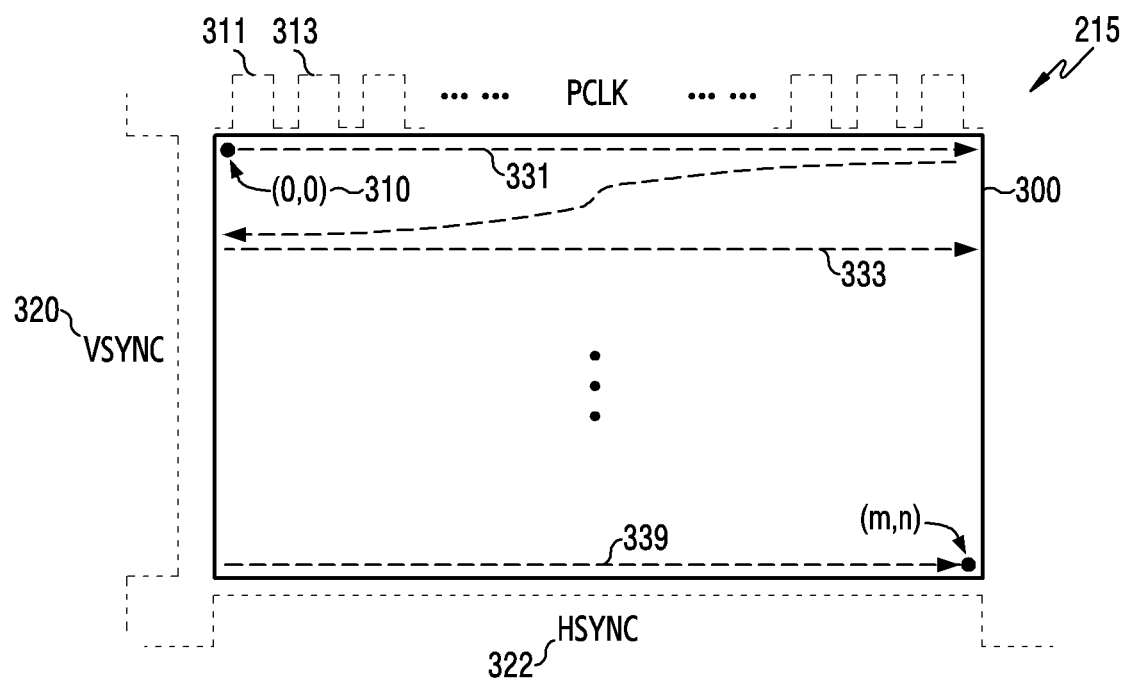
FIG. 3 is a diagram illustrating an example image frame read out via an image sensor in an electronic device according to various embodiments.

FIG. 3 is a diagram illustrating an example image frame 300 read out via the image sensor 215 in the electronic device 100 according to various embodiments. The image frame 300 may be read out by an image sensor (e.g., the image sensor 215 of FIG. 2). The image frame 300 of FIG. 3 may correspond to an image frame 401 and 402 of FIG. 4 and/or an image frame 710 and 720 of FIG. 7.

According to an embodiment, a plurality of pixels included in the image sensor 215 may be disposed based on a two-dimensional array. Referring to FIG. 3, m×n pixels may be disposed such that m pixels are disposed in the horizontal axis and n pixels are disposed in the vertical axis. The plurality of pixels may be disposed along horizontal lines or vertical lines related to the horizontal axis or the vertical axis, respectively. In the example of FIG. 3, a plurality of pixels may be disposed along m vertical lines and/or n horizontal lines.

According to an embodiment, the image sensor 215 may sequentially read out pixels disposed in the image sensor 215. For example, in case that the image sensor 215 outputs pixel data corresponding to the first pixel 310 at a first pixel clock 311, the image sensor 215 may output pixel data corresponding to a second pixel at a second pixel clock 313 subsequent to the first pixel clock 311. The image sensor 215 may output, to at least one configuration, pixel data corresponding to any one among a plurality of pixels for each designated clock (e.g., each pixel clock).

According to an embodiment, the image sensor 215 may sequentially read out pixels in a unit of a line. In other words, the image sensor 215 may start read-out from a first line 331 and may continue read-out until a last line 339. For example, the image sensor 215 may start reading out the first line 331 and then read out a second line 333.

According to an embodiment, the image sensor 215 may output the read out pixel data in a unit of a single frame. For example, the image sensor 215 may output the image frame 300, which is read out in a unit of a frame, to a buffer and/or at least one processor (e.g., AP and/or ISP).

According to an embodiment, a vertical synchronization signal (Vsync) 320 may be output in a unit of a frame, and may be used for distinguishing a frame from another frame. According to an embodiment, a horizontal synchronization signal (Hsync) 322 may be output in a unit of a line, and may be used for distinguishing a line from another line. A line that is read out when a horizontal synchronization signal is high in one line may be identified as being valid.

Figure 4:
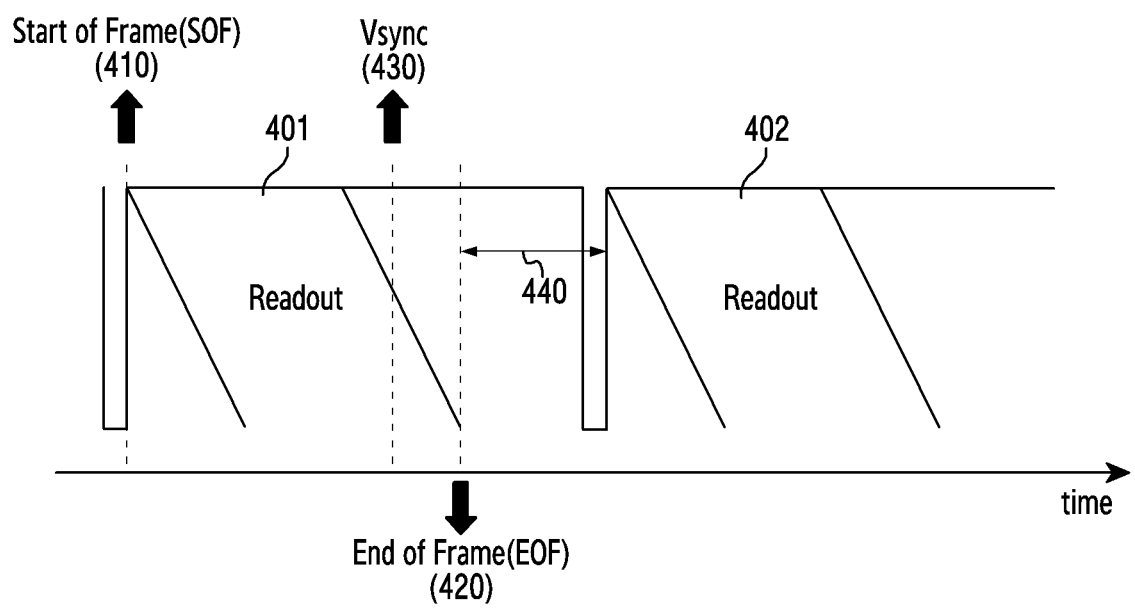
FIG. 4 is a diagram illustrating an example process in which an image sensor reads out an image frame in a unit of a frame in an electronic device according to various embodiments.

FIG. 4 is a diagram illustrating an example process in which the image sensor 215 reads out an image frame in a unit of a frame in the electronic device 100 according to various embodiments.

According to an embodiment, the electronic device 100 may obtain a plurality of image frames at predetermined time intervals via the image sensor 215. For example, the image sensor 215 may read out a first image frame 401 and may read out a second image frame 402 sequentially at predetermined time intervals.

Referring to FIG. 4, the image sensor 215 may sequentially read out the first image frame 401 and the second image frame 402. The image sensor 215 may output the first image frame 401 and the second image frame 402 read out, and may transfer the same to the processor 230 (e.g., an image signal processor).

According to an embodiment, the image sensor 215 may transfer, to the processor 230, information associated with a start of frame (SOF) 410 of the first image frame 401 and an end of frame (EOF) 420 of the first image frame 401. The SOF 410 may be understood as the point in time at which read-out of the first image frame 401 starts, and the EOF 420 may be understood as the point in time at which read-out of the first image frame 402 is completed. Based on at least one marker included in the first image frame 401, the processor 230 may be aware of the state and the end of the first image frame 401 and may determine whether the first image frame 401 is completely output.

According to an embodiment, a first vertical synchronization signal (Vsync) 430 may be produced while the first image frame 401 is read out. The first vertical synchronization signal 430 may be produced at any point in time during a process in which the first image frame 401 is read out. For example, the first vertical synchronization signal 430 may be produced to be close to the EOF 420. In other words, the first vertical synchronization signal 430 may be changed from low to high, or from high to low, in an interval corresponding to the point in time at which the read-out of the first image frame 401 is completed.

According to an embodiment, a blank time 440 may be present between the completion of read-out of a single frame and a start of read-out of a subsequent frame. For example, a predetermined period of time (e.g., the blank time 440) after read-out of the first image frame 401 is completed at the EOF 420, the read-out of the second image frame 402 may start. The process described above may be repeated in a unit of a frame.

Figure 5:
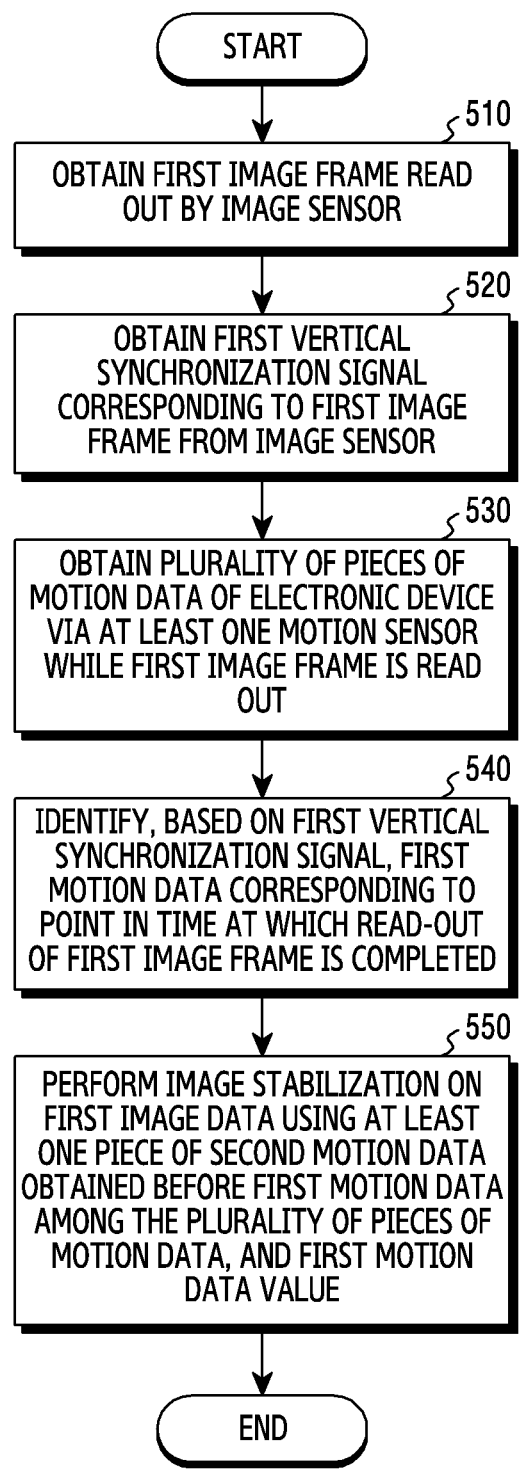
FIG. 5 is a flowchart illustrating an example process of performing image stabilization (e.g., video digital image stabilization (VDIS)) using an obtained image frame and motion data in an electronic device according to various embodiments.

FIG. 5 is a flowchart illustrating an example process of performing image stabilization (e.g., video digital image stabilization (VDIS)) using an obtained image frame and motion data in the electronic device 100 according to various embodiments.

In operation 510 according to an embodiment, the processor 230 may obtain a first image frame read out by the image sensor 215. The first image frame may be at least one of a plurality of image frames read out by the image sensor 215. The processor 230 may obtain an image frame by a predetermine cycle based on the performance of the image sensor 215 and/or the camera module 210. For example, the processor 230 may obtain, from the image sensor 215, an image frame by a cycle of 30 fps. However, this is merely an example, the processor 230 may obtain an image frame by a cycle that is shorter or longer than that.

In operation 520 according to an embodiment, the processor 230 may obtain, from the image sensor 215, a first vertical synchronization signal (Vsync) corresponding to the first image frame. The first vertical synchronization signal may be a signal that indicates the start and the end of the first image frame.

In operation 530 according to an embodiment, the processor 230 may obtain a plurality of pieces of motion data of the electronic device 100 via the at least one motion sensor 220, while the first image frame is read out. The plurality of pieces of motion data of the electronic device 100 may be a plurality of pieces of motion data associated with the electronic device 100. For example, the plurality of pieces of motion data may be understood as a plurality of pieces of motion data that the processor 230 obtains while shaking of the electronic device 100 is detected via a gyro sensor. The plurality of pieces of motion data may be the yaw, pitch, and roll values of the electronic device 100 obtained via a gyro sensor. As another example, the plurality of pieces of motion data may be understood as a plurality of pieces of motion data that the processor 230 obtains while shaking of the electronic device 100 is detected via a geomagnetic sensor. The plurality of pieces of motion data may include azimuth values.

According to an embodiment, the processor 230 may obtain the plurality of pieces of motion data by a cycle shorter than that of the image frame. For example, while obtaining an image frame by a cycle of 30 fps via the image sensor 215, the processor 230 may obtain and process gyro data using a gyro sensor by a cycle of 1 kHz. However, this is merely an example, the processor 230 may obtain gyro data by a cycle shorter or longer than that.

In operation 540 according to an embodiment, the processor 230 may identify, based on the first vertical synchronization signal, first motion data corresponding to the point in time at which read-out of the first image frame is completed. The first vertical synchronization signal may be changed at the point in time at which the read-out of the first image frame starts (e.g., the SOF 410 of FIG. 4) and/or at the point in time at which the read-out of the first image frame ends (e.g., the EOF 420 of FIG. 4). For example, the first vertical synchronization signal may be changed from a low signal to a high signal at the point in time at which the read-out of the first image frame starts, and may be changed from a high signal to a low signal at the point in time at which the read-out of the first image frame ends.

According to an embodiment, the processor 230 may identify a first vertical synchronization signal that is changed at the point in time at which the read-out of the first image frame is completed. The processor 230 may determine motion data (e.g., gyro data and/or OIS data) corresponding to the identified first vertical synchronization signal.

In operation 550 according to an embodiment, the processor 230 may perform image stabilization (e.g., VDIS) on the first image frame using at least one piece of second motion data obtained before the first motion data among the plurality of pieces of motion data and the first motion data. According to an embodiment, the processor 230 may perform image stabilization (e.g., VDIS) on the first image frame using the at least one piece of second motion data, the first motion data, and OIS data. The OIS data may be understood as movement information of a lens for optical image stabilization performed by the OIS actuator 213 via operating OIS, and may be recognized via hall data obtained via a hall sensor.

According to an embodiment, the processor 230 may determine the at least one piece of second motion data based on the first motion data. The first motion data and the at least one piece of second motion data may be motion data obtained while the first image frame is read out. A more detailed description thereof will be provided below with reference to FIG. 7.

Figure 6:
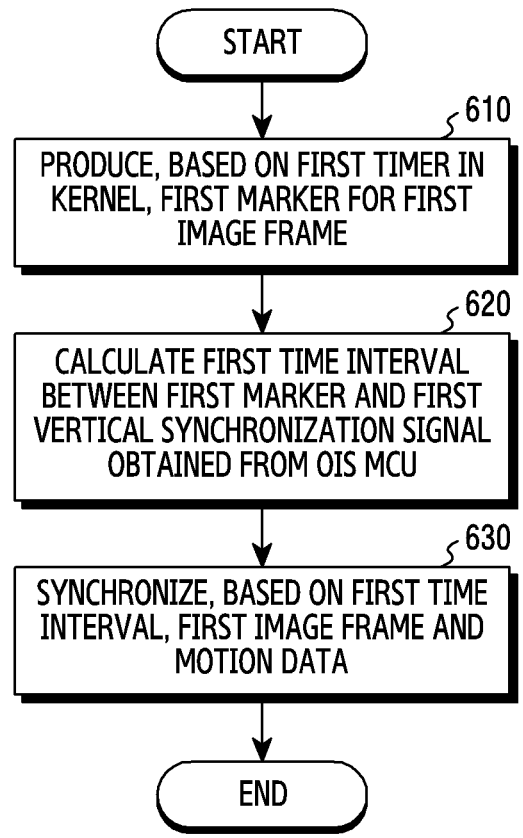
FIG. 6 is a flowchart illustrating an example process of performing synchronization on an image frame and motion data in an electronic device according to various embodiments.

FIG. 6 is a flowchart illustrating an example process of performing synchronization on an image frame and motion data in the electronic device 100 according to various embodiments.

In operation 610 according to an embodiment, the processor 230 may produce, based on a first timer in the kernel, a first marker for a first image frame. In other words, the first image frame read out by the image sensor 215 may be transferred to a kernel, and, while the first image frame is read out by a timer of the kernel, the first marker associated with a predetermined point in time may be produced. For example, the first marker may correspond to a first point in time at which the read-out of the first image frame is completed or may correspond to a second point in time at which the read-out of the first image frame starts.

In operation 620 according to an embodiment, the processor 230 may calculate a first time interval between the first marker and a first vertical synchronization signal obtained by the OIS MCU 231. The first marker may correspond to the point in time at which the read-out of the image frame is completed.

In operation 630 according to an embodiment, the processor 230 may synchronize the first image frame and motion data (e.g., gyro data and OIS data) based on the first time interval. According to an embodiment, the processor 230 may determine, based on the first time interval, data for performing VDIS. For example, the processor 230 may determine reference data (e.g., the first reference data 713 of FIG. 7) by excluding the first time interval from the point in time corresponding to the first marker. According to an embodiment, the processor 230 may synchronize the first image frame and the motion data (e.g., gyro data and OIS data) by compensating the first time interval for an offset of the interval for each frame or by reducing or removing the interval.

Figure 7:
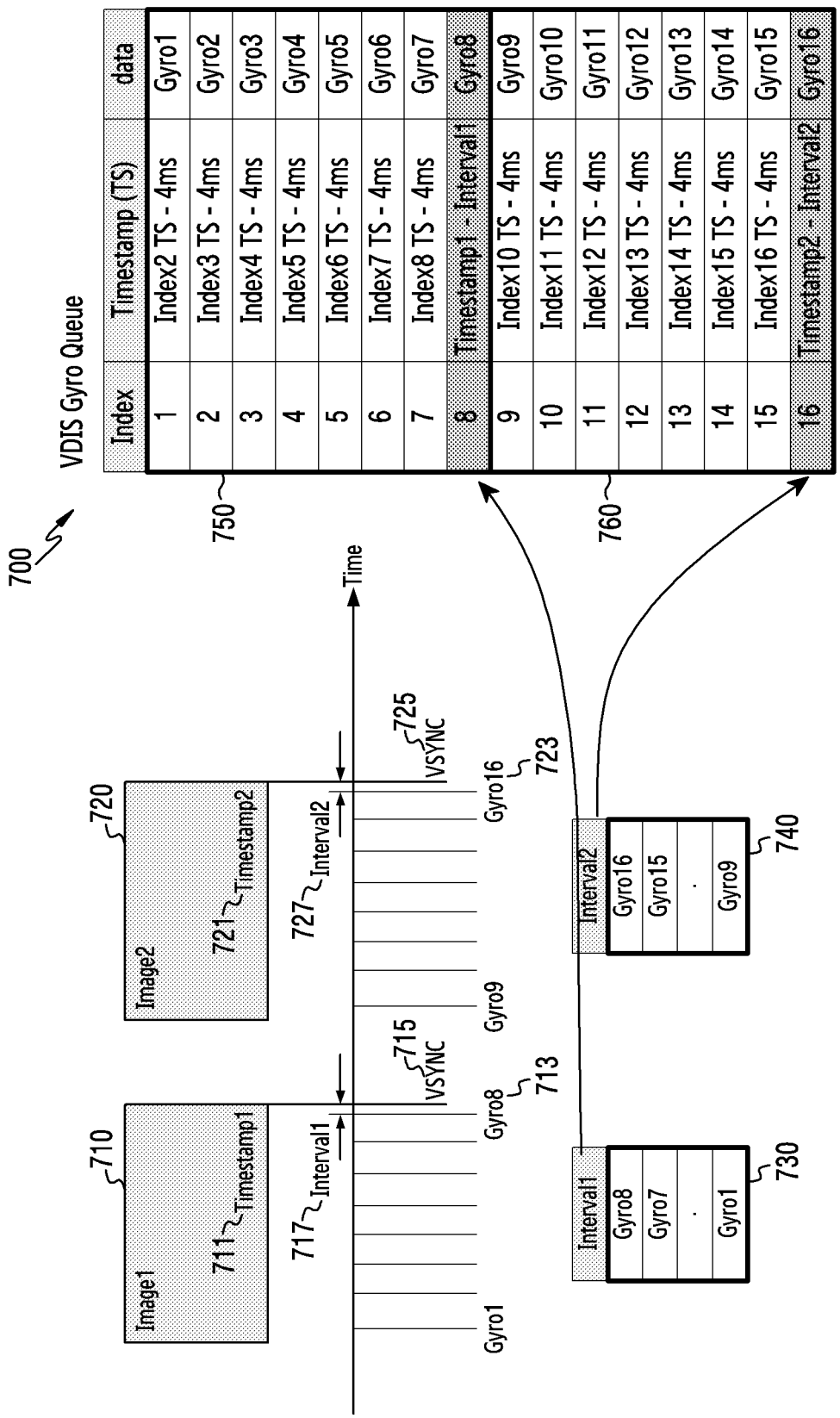
FIG. 7 is a diagram illustrating an example process of obtaining an image frame and synchronized motion data in an electronic device according to various embodiments.

FIG. 7 is a diagram illustrating an example process of obtaining an image frame and synchronized motion data in the electronic device 100 according to various embodiments. A first image frame 710 and a second image frame 720 of FIG. 7 may correspond to the first image frame 401 and the second image frame 402 of FIG. 4.

Referring to FIG. 7, a first image frame 710 and a plurality of pieces of motion data 730 corresponding to the first image frame 710 are illustrated. In addition, referring to FIG. 7, a second image frame 720 and a plurality of pieces of motion data 740 corresponding to the second image frame 720 are illustrated. The image sensor 215 may sequentially read out and output the first image frame 710 and the second image frame 720. The processor 230 may obtain the first image frame 710 and the second image frame 720 read out by an image sensor (e.g., the image sensor 215 of FIG. 2). The processor 230 may obtain a plurality of pieces of motion data 730 and 740 via the motion sensor 220 (e.g., a gyro sensor, a geomagnetic sensor).

According to an embodiment, the processor 230 may determine, based on the first vertical synchronization signal 715, first reference data 713 (e.g., gyro 8) corresponding to the first image frame 710. For example, the processor 230 may configure, as the first reference data 713, motion data (e.g., gyro 8) obtained latest from the point in time at which the first vertical synchronization signal 715 is produced. In addition, the processor 230 may determine, based on a second vertical synchronization signal 725, second reference data 723 (e.g., gyro 16) corresponding to the second image frame 720. For example, the processor 230 may configure, as the second reference data 723, motion data (e.g., gyro 16) obtained latest from the point in time at which the second vertical synchronization signal 725 is produced.

According to an embodiment, at least one marker may be determined for the output first image frame 710 and second image frame 720. For example, the first image frame 710 may include a first marker 711, and the second image frame 720 may include a second marker 721. The first marker 711 may be referred to as a first time stamp, and the second marker 721 may be referred to as a second time stamp. According to an embodiment, the first marker 711 may be included in at least part of the first image frame 710. For example, the first marker 711 may be included in the start (e.g., SOF 410 of FIG. 4) of the first image frame 710 or may be included in the end (e.g., EOF 420 of FIG. 4) of the first image frame 710. For example, the second marker 721 may be included in the start (SOF) of the second image frame 720 or may be included in the end (EOF) of the second image frame 720.

According to an embodiment, the processor 230 may calculate a first time interval 717 based on the first marker 711 and the first vertical synchronization signal 715. The processor 230 may calculate a second time interval 727 based on the second marker 721 and the second vertical synchronization signal 725.

According to an embodiment, the processor 230 may obtain motion data and an image frame to be used for image stabilization (e.g., VDIS). According to an embodiment, the processor 230 may obtain a queue 700 based on a time stamp and motion data. The queue 700 may include a first data package 750 and a second data package 760, which are described in greater detail below.

According to an embodiment, the processor 230 may obtain the first data package 750 to be used for image stabilization (e.g., VDIS) using the first reference data 713, a plurality of pieces of motion data 730, and data associated with the first time interval 717. In other words, the processor 230 may obtain the first data package 750 based on the first reference data 713 (e.g., gyro 8), at least one piece of motion data (e.g., gyro 1 to gyro 7) obtained before the first reference data 713, and the first time interval 717. In the same manner, the processor 230 may obtain the second data package 760 to be used for image stabilization (e.g., VDIS) using the second reference data 723, a plurality of pieces of motion data 740, and data associated with the second time interval 727.

According to an embodiment, the first data package 750 may include a plurality of pieces of VDIS data (e.g., time stamps (TS) and motion data corresponding to index 1 to index 8 in the queue 700) to be used for image stabilization (e.g., VDIS). For example, index 8 (e.g., the first reference data 713) may be data at a point in time obtained by excluding the first time interval 717 from the point in time of the first marker 711. Indices 1 to 7 may be determined based on an interval by which motion data is obtained via a gyro sensor. For example, in case that gyro data is obtained every 4 ms, index 7 may be data obtained 4 ms earlier than a marker for index 8.

According to an embodiment, the processor 230 may perform image stabilization (e.g., VDIS) based on an obtained image frame and motion data corresponding to the image frame. For example, the processor 230 may perform image stabilization (e.g., VDIS) on the first image frame 710 based on the obtained first data package 750 and/or OIS data. For example, the processor 230 may perform image stabilization (e.g., VDIS) on the second image frame 720 based on the obtained second data package 760 and/or OIS data.

Figure 8:
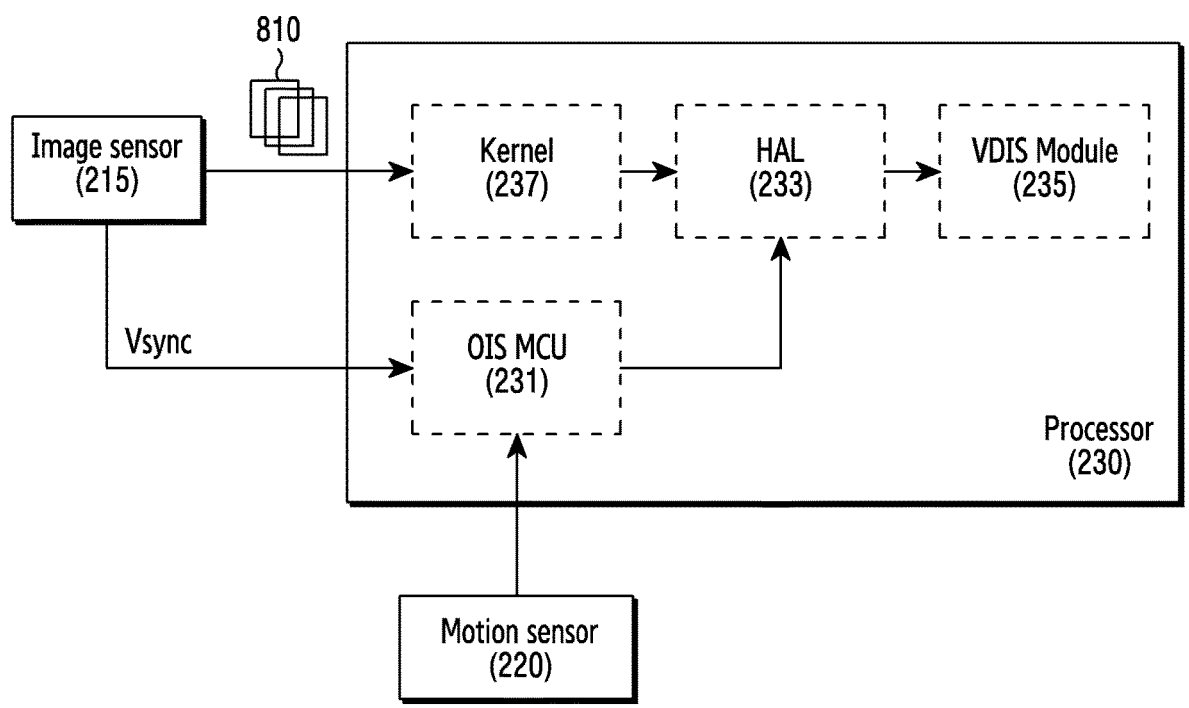
FIG. 8 is a block diagram illustrating an example path in which data obtained from an image sensor and a motion sensor is transferred in an electronic device according to various embodiments.

FIG. 8 is a block diagram illustrating an example path in which data obtained from the image sensor 215 and the motion sensor 220 is transferred in the electronic device 100 according to various embodiments.

According to an embodiment, the processor 230 may obtain data needed for image stabilization (e.g., VDIS) via the image sensor 215 and the motion sensor 220 (e.g., a gyro sensor). For example, the processor 230 may obtain a plurality of image frames 810, a vertical synchronization signal, and a plurality of pieces of motion data (e.g., gyro data and/or OIS data) via the image sensor 215 and/or the motion sensor 220 (e.g., a gyro sensor).

According to an embodiment, in case that data needed for image stabilization (e.g., VDIS) is obtained, the processor 230 may include a marker (e.g., a time stamp (TS)) in the needed data. For example, the processor 230 may include markers in the plurality of image frames 810 via a first timer of a kernel 237. According to an embodiment, the first timer of the kernel 237 is different from a second timer of the OIS MCU 231, and thus the processor 230 may perform synchronization by changing the OIS MCU 231 to an application processor (AP) time.

According to an embodiment, the image sensor 215 may read out the plurality of image frames 810, and may transfer the same to the kernel 237. The plurality of image frames 810 transferred to the kernel 237 may be transferred to a HAL 233 via the kernel 237. The image frame 810 transferred to the kernel 237 may include a marker by the first timer of the kernel 237, and the plurality of image frames 810 including a marker may be transferred to a VDIS module 235 via the HAL 233. According to an embodiment, the image sensor 215 may transfer a vertical synchronization signal (Vsync) to the OIS MCU 231, and the motion sensor 220 may transfer a plurality of pieces of motion data to the OIS MCU 231. The OIS MCU 231 may transfer an obtained vertical synchronization signal and/or a plurality of pieces of motion data to the VDIS module 235 via the HAL 233. According to an embodiment, the OIS MCU 231 may synchronize an image frame and data (e.g., a plurality of pieces of motion data and/or OIS data) corresponding to the image frame by transferring a plurality of pieces of motion data and/or OIS data to the VDIS module 235 according to the vertical synchronization signal.

Figure 9:
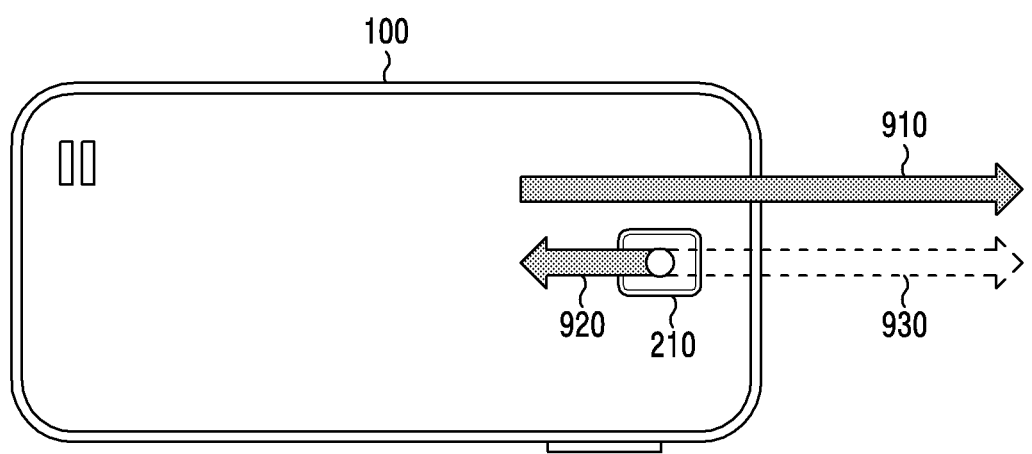
FIG. 9 is a diagram illustrating an example operation of performing image stabilization based on first motion information obtained from a motion sensor and second motion information caused by operating OIS in an electronic device according to various embodiments.

FIG. 9 is a diagram illustrating an example operation of performing image stabilization based on first motion information obtained from the motion sensor 220 and second motion information caused by operating OIS in the electronic device 100 according to various embodiments.

Referring to FIG. 9, the electronic device 100 may shake in the direction of a reference numeral 910 due to various causes such as shaking of a hand of a user. The processor 230 may detect a movement of the electronic device 100 via the motion sensor 220 (e.g., a gyro sensor), and may determine first motion information (e.g., first motion data of FIG. 5) associated with the direction of the reference numeral 910.

According to an embodiment, in response to shaking of the electronic device 100 in the direction of the reference numeral 910, the OIS actuator 213 may perform control so that the lens assembly 211 and/or an image sensor 524 move in the direction of a reference numeral 920 that is opposite to the direction of the reference numeral 910. Due to a physical limit such as the range of an angle by which the lens assembly 211 and/or image sensor 215 is capable of moving, the length of the reference numeral 920 may be shorter than the length of the reference numeral 910.

According to an embodiment, the processor 230 may obtain, from the camera module 210, an image frame on which OIS is performed. The image frame on which OIS is performed may have as much residual shaking as a reference numeral 930. The processor 230 may estimate second motion information associated with the direction of the reference numeral 920 from the first motion information associated with the direction of the reference numeral 910, and may determine third motion information obtained by removing the second motion information from the first motion information. The third motion information may be motion information associated with the reference numeral 930. The processor 230 may determine the third motion information based on an equation read as "third motion information=first motion information—second motion information".

Figure 10:
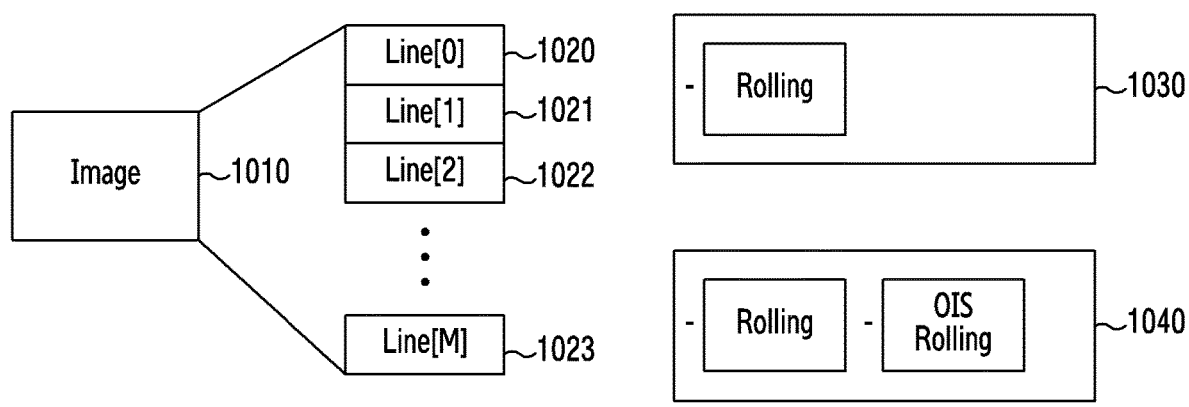
FIG. 10 is a diagram illustrating an example operation of performing compensation on an image frame in a unit of a line in an electronic device according to various embodiments.

FIG. 10 is a diagram illustrating an example operation of performing compensation on an image frame in a unit of a line in the electronic device 100 according to various embodiments.

Referring to FIG. 10, the image sensor 215 may sequentially read out light from a first line 1020 to a last line 1023 of an image frame 1010. The operation in which the electronic device 100 reads out light in a unit of line may be referred to as a rolling shutter operation. The point in time at which light reflected from a subject enters the image sensor 215 is different for each line, and thus distortion may occur in an image due to a difference in time of light. In the disclosure, distortion that occurs due to a rolling shutter operation may be referred to as rolling shutter distortion or jello effect.

According to an embodiment, the frequency of motion data obtained via the motion sensor 220 may be higher than the frequency of image frames obtained via the camera module 210 during the same time. For example, the electronic device 100 may obtain the image frame 1010 every 30 ms, and may obtain motion data every 10 ms. The electronic device 100 may perform compensation on the image frame 1010 in a unit of line using two or more pieces of motion data.

According to an embodiment, referring to a reference numeral 1030, the electronic device 100 may compensate for rolling shutter distortion in the image frame 1010 using two or more pieces of motion data (e.g., gyro data). According to an embodiment, two or more pieces of first motion information may be obtained for each of the lines (e.g., 1020, 1021, 1022, 1023) in the image frame 1010. According to an embodiment, the electronic device 100 may obtain motion data for at least two or more lines among the lines. For example, the electronic device 100 may obtain motion data for the first line 1020 and motion data for the second line 1021 in the image frame 1010. The electronic device 100 may use the obtained two pieces of motion data and interpolation so as to estimate motion data for the remaining lines for which motion data are not obtained. Based on the obtained motion data and estimated motion data, the electronic device 100 may produce motion data for each of the lines in the image frame 1010, and may compensate for rolling shutter distortion in a unit of a line.

According to an embodiment, referring to reference numeral 1040, the electronic device 100 may compensate for rolling shutter distortion in a unit of a line in the image frame 1010 using two or more pieces of motion data (e.g., gyro data) and OIS data. Based on motion data (e.g., gyro data) and OIS data corresponding to the motion data, the electronic device 100 may perform compensation for rolling shutter distortion and/or may perform VDIS in the image frame 1010. The OIS data may be hall data obtained via a hall sensor for operating OIS. According to an embodiment, using the obtained two pieces of motion data and interpolation, the electronic device 100 may estimate motion data for the remaining lines for which motion data are not obtained. Based on the estimated motion data and OIS data corresponding to the estimated motion data, the electronic device 100 may perform compensation for rolling shutter distortion and/or may perform VDIS in the image frame 1010.

Figure 11:
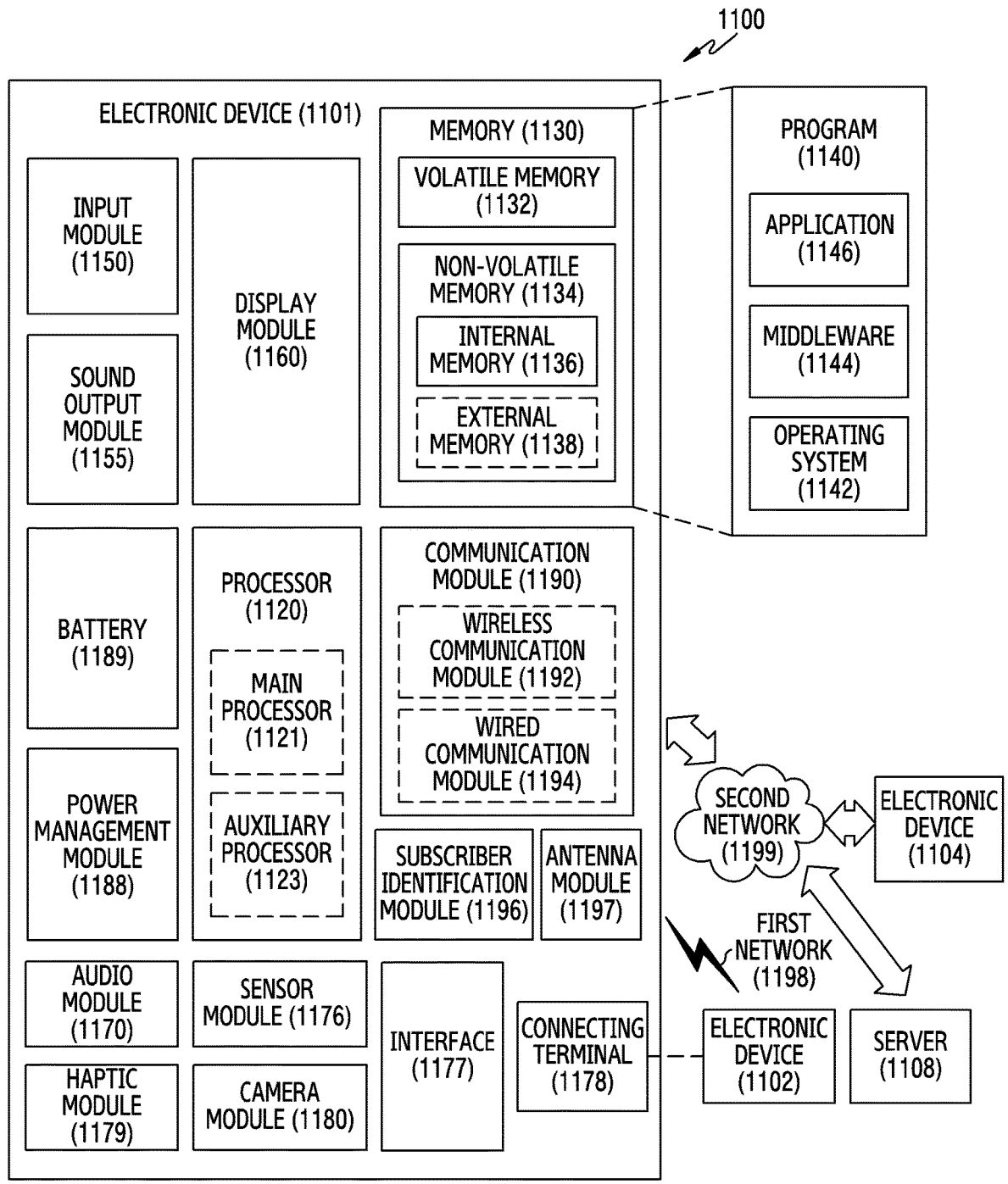
FIG. 11 is a block diagram illustrating an example electronic device in a network environment according to various embodiments.

FIG. 11 is a block diagram illustrating an example electronic device 1101 in a network environment 1100 according to various embodiments.

Referring to FIG. 11, the electronic device 1101 in the network environment 1100 may communicate with an electronic device 1102 via a first network 1198 (e.g., a short-range wireless communication network), or an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input module 1150, a sound output module 1155, a display module 1160, an audio module 1170, a sensor module 1176, an interface 1177, a connecting terminal 1178, a haptic module 1179, a camera module 1180, a power management module 1188, a battery 1189, a communication module 1190, a subscriber identification module (SIM) 1196, or an antenna module 1197. In various embodiments, at least one of the components (e.g., the connecting terminal 1178) may be omitted from the electronic device 1101, or one or more other components may be added in the electronic device 1101. In various embodiments, some of the components (e.g., the sensor module 1176, the camera module 1180, or the antenna module 1197) may be implemented as a single component (e.g., the display module 1160).

The processor 1120 may execute, for example, software (e.g., a program 1140) to control at least one other component (e.g., a hardware or software component) of the electronic device 1101 coupled with the processor 1120, and may perform various data processing or computation. According to an embodiment, as at least part of the data processing or computation, the processor 1120 may store a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), or an auxiliary processor 1123 (e.g., a graphics processing unit (GPU), a neural processing unit (NPU), an image signal processor (ISP), a sensor hub processor, or a communication processor (CP)) that is operable independently from, or in conjunction with, the main processor 1121. For example, when the electronic device 1101 includes the main processor 1121 and the auxiliary processor 1123, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display module 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123. According to an embodiment, the auxiliary processor 1123 (e.g., the neural processing unit) may include a hardware structure specified for artificial intelligence model processing. An artificial intelligence model may be generated by machine learning. Such learning may be performed, e.g., by the electronic device 1101 where the artificial intelligence is performed or via a separate server (e.g., the server 1108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input module 1150 may receive a command or data to be used by other component (e.g., the processor 1120) of the electronic device 1101, from the outside (e.g., a user) of the electronic device 1101. The input module 1150 may include, for example, a microphone, a mouse, a keyboard, a key (e.g., a button), or a digital pen (e.g., a stylus pen).

The sound output module 1155 may output sound signals to the outside of the electronic device 1101. The sound output module 1155 may include, for example, a speaker or a receiver. The speaker may be used for general purposes, such as playing multimedia or playing record. The receiver may be used for receiving calls. According to an embodiment, the receiver may be implemented as separate from, or as part of the speaker.

The display module 1160 may visually provide information to the outside (e.g., a user) of the electronic device 1101. The display module 1160 may include, for example, a display, a hologram device, or a projector and control circuitry to control a corresponding one of the display, hologram device, and projector. According to an embodiment, the display module 1160 may include a touch sensor adapted to detect a touch, or a pressure sensor adapted to measure the intensity of force incurred by the touch.

The audio module 1170 may convert a sound into an electrical signal and vice versa. According to an embodiment, the audio module 1170 may obtain the sound via the input module 1150, or output the sound via the sound output module 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to an embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™ wireless-fidelity (Wi-Fi) direct, or infrared data association (IrDA)) or the second network 1199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The wireless communication module 1192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1192 may support a high-frequency band (e.g., the mmWave band) to achieve, e.g., a high data transmission rate. The wireless communication module 1192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1192 may support various requirements specified in the electronic device 1101, an external electronic device (e.g., the electronic device 1104), or a network system (e.g., the second network 1199). According to an embodiment, the wireless communication module 1192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1197 may transmit or receive a signal or power to or from the outside (e.g., the external electronic device) of the electronic device 1101. According to an embodiment, the antenna module 1197 may include an antenna including a radiating element including a conductive material or a conductive pattern formed in or on a substrate (e.g., a printed circuit board (PCB)). According to an embodiment, the antenna module 1197 may include a plurality of antennas (e.g., array antennas). In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

According to various embodiments, the antenna module 1197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 or 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, mobile edge computing (MEC), or client-server computing technology may be used, for example. The electronic device 1101 may provide ultra low-latency services using, e.g., distributed computing or mobile edge computing. In an embodiment, the external electronic device 1104 may include an internet-of-things (IoT) device. The server 1108 may be an intelligent server using machine learning and/or a neural network. According to an embodiment, the external electronic device 1104 or the server 1108 may be included in the second network 1199. The electronic device 1101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 12:
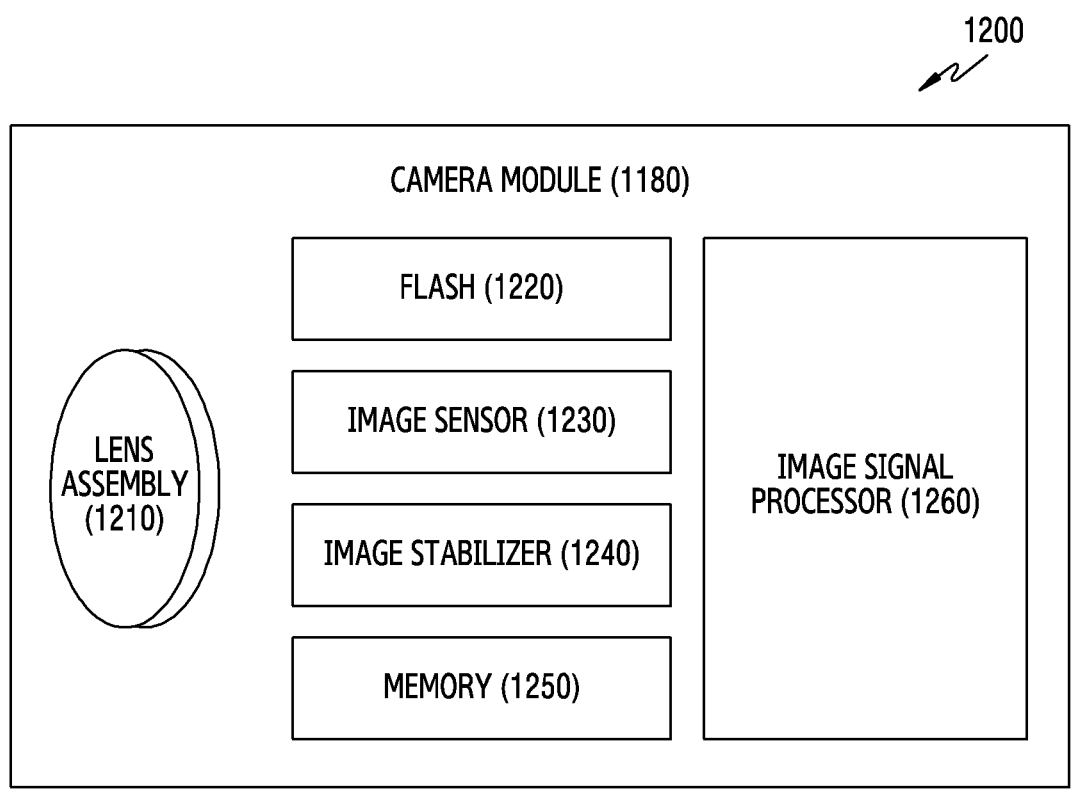
FIG. 12 is a block diagram illustrating an example configuration of a camera module according to various embodiments.

FIG. 12 is a block diagram 1200 illustrating an example configuration of the camera module 1180 according to various embodiments. Referring to FIG. 12, the camera module 1180 may include a lens assembly 1210, a flash 1220, an image sensor 1230, an image stabilizer (e.g., including various circuitry and/or executable program instructions) 1240, memory 1250 (e.g., buffer memory), or an image signal processor (e.g., including processing circuitry) 1260. The lens assembly 1210 may collect light emitted or reflected from an object whose image is to be taken. The lens assembly 1210 may include one or more lenses. According to an embodiment, the camera module 1180 may include a plurality of lens assemblies 1210. In such a case, the camera module 1180 may form, for example, a dual camera, a 360-degree camera, or a spherical camera. Some of the plurality of lens assemblies 1210 may have the same lens attribute (e.g., view angle, focal length, auto-focusing, f number, or optical zoom), or at least one lens assembly may have one or more lens attributes different from those of another lens assembly. The lens assembly 1210 may include, for example, a wide-angle lens or a telephoto lens.

The flash 1220 may emit light that is used to reinforce light reflected from an object. According to an embodiment, the flash 1220 may include one or more light emitting diodes (LEDs) (e.g., a red-green-blue (RGB) LED, a white LED, an infrared (IR) LED, or an ultraviolet (UV) LED) or a xenon lamp. The image sensor 1230 may obtain an image corresponding to an object by converting light emitted or reflected from the object and transmitted via the lens assembly 1210 into an electrical signal. According to an embodiment, the image sensor 1230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1230 may be implemented using, for example, a charged coupled device (CCD) sensor or a complementary metal oxide semiconductor (CMOS) sensor.

The image stabilizer 1240 may move the image sensor 1230 or at least one lens included in the lens assembly 1210 in a particular direction, or control an operational attribute (e.g., adjust the read-out timing) of the image sensor 1230 in response to the movement of the camera module 1180 or the electronic device 1101 including the camera module 1180. This allows compensating for at least part of a negative effect (e.g., image blurring) by the movement on an image being captured.

According to an embodiment, the image stabilizer 1240 may sense such a movement by the camera module 1180 or the electronic device 1101 using a gyro sensor (not shown) or an acceleration sensor (not shown) disposed inside or outside the camera module 1180. According to an embodiment, the image stabilizer 1240 may be implemented, for example, as an optical image stabilizer.

The memory 1250 may store, at least temporarily, at least part of an image obtained via the image sensor 1230 for a subsequent image processing task. For example, if image capturing is delayed due to shutter lag or multiple images are quickly captured, a raw image obtained (e.g., a Bayer-patterned image, a high-resolution image) may be stored in the memory 1250, and its corresponding copy image (e.g., a low-resolution image) may be previewed via the display module 1160. Thereafter, if a specified condition is met (e.g., by a user's input or system command), at least part of the raw image stored in the memory 1250 may be obtained and processed, for example, by the image signal processor 1260. According to an embodiment, the memory 1250 may be configured as at least part of the memory 1130 or as a separate memory that is operated independently from the memory 1130.

The image signal processor 1260 may include various processing circuitry and perform one or more image processing with respect to an image obtained via the image sensor 1230 or an image stored in the memory 1250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1260 may perform control (e.g., exposure time control or read-out timing control) with respect to at least one (e.g., the image sensor 1230) of the components included in the camera module 1180. An image processed by the image signal processor 1260 may be stored back in the memory 1250 for further processing, or may be provided to an external component (e.g., the memory 1130, the display module 1160, the electronic device 1102, the electronic device 1104, or the server 1108) outside the camera module 1180. According to an embodiment, the image signal processor 1260 may be configured as at least part of the processor 1120, or as a separate processor that is operated independently from the processor 1120. If the image signal processor 1260 is configured as a separate processor from the processor 1120, at least one image processed by the image signal processor 1260 may be displayed, by the processor 1120, via the display module 1160 as it is or after being further processed.

According to an embodiment, the electronic device 1101 may include a plurality of camera modules 1180 having different attributes or functions. In such a case, at least one of the plurality of camera modules 1180 may form, for example, a wide-angle camera and at least another of the plurality of camera modules 1180 may form a telephoto camera. Similarly, at least one of the plurality of camera modules 1180 may form, for example, a front camera and at least another of the plurality of camera modules 1180 may form a rear camera.

An electronic device according to an example embodiment of the disclosure may include: a camera module including an optical image stabilization (OIS) actuator and an image sensor configured to read out an image frame obtained based on image stabilization being performed via the optical image stabilization (OIS) actuator, at least one motion sensor, and at least one processor operatively connected to the camera module and the at least one motion sensor. The at least one processor may be configured to: obtain a first image frame read out via the image sensor, to obtain, from the image sensor, a first vertical synchronization signal (Vsync) corresponding to the first image frame, obtain a plurality of pieces of motion data corresponding to a movement of the electronic device via the at least one motion sensor, while the first image frame is read out, to identify, based on the first vertical synchronization signal, first motion data corresponding to a first point in time at which read-out of the first image frame is completed, and perform digital image stabilization (DIS) on the first image frame using at least one piece of second motion data obtained before the first motion data among the plurality of pieces of motion data, and the first motion data.

The electronic device according to an example embodiment of the disclosure, the first image frame may include a first marker based on a first timer.

In the electronic device according to an example embodiment of the disclosure, the at least one processor may be configured to: calculate a first time interval between a first marker included in the first image frame and a first vertical synchronization signal, and based on the first motion data, the at least one piece of second motion data, and data associated with the first time interval, obtain a first data package to be used for the digital image stabilization.

In the electronic device according to an example embodiment of the disclosure, the at least one processor may be configured to perform, based on the first data package and an amount of stabilization performed on the first image frame by the OIS actuator, the digital image stabilization on the first image frame.

In the electronic device according to an example embodiment of the disclosure, the at least one processor may be configured to reduce or remove the first time interval for a second image frame subsequent to the first image frame.

In the electronic device according to an example embodiment of the disclosure, the first maker may correspond to at least one of the first point in time at which read-out of the first image frame is completed or a second point in time at which read-out of the first image frame starts.

In the electronic device according to an example embodiment of the disclosure, the plurality of pieces of motion data may be obtained at regular intervals, and the at least one processor may be configured to identify, based on the first motion data and the regular interval, at least one pieces of second motion data.

In the electronic device according to an example embodiment of the disclosure, the at least one motion sensor may include a gyro sensor, and the plurality of pieces of motion data may include at least one of gyro data or OIS data.

A method of operating an electronic device according to an example embodiment of the disclosure may include: obtaining a first image frame read out via an image sensor, obtaining, from the image sensor, a first vertical synchronization signal (Vsync) corresponding to the first image frame, obtaining, by at least one motion sensor, a plurality of pieces of motion data corresponding to a movement of the electronic device while the first image frame is read out, identifying, based on the first vertical synchronization signal, first motion data corresponding to a first point in time at which read-out of the first image frame is completed, and performing digital image stabilization (DIS) on the first image frame using at least one pieces of second motion data obtained before the first motion data among the plurality of pieces of motion data, and the first motion data.

In the method of operating an electronic device according to an example embodiment of the disclosure, the first image frame may include a first marker based on a first timer.

The method of operating an electronic device according to an example embodiment of the disclosure may include: calculating a first time interval between a first marker included in the first image frame and the first vertical synchronization signal, and obtaining a first data package to be used for the digital image stabilization based on the first motion data, at least one piece of second motion data, and data associated with the first time interval.

The method of operating an electronic device according to an example embodiment of the disclosure may include: performing digital image stabilization on the first image frame based on the amount of stabilization performed on the first image frame by an OIS actuator and the first data packager.

The method of operating an electronic device according to an example embodiment of the disclosure may include reducing or removing the first time interval for a second image frame subsequent to the first image frame.

In the method of operating an electronic device according to an example embodiment of the disclosure, the first marker may correspond to at least one of the first point in time at which read-out of the first image frame is completed or a second point in time at which read-out of the first image frame starts.

The method of operating an electronic device according to an example embodiment of the disclosure may include obtaining the plurality of pieces of motion data at regular intervals, and identifying the at least one piece of second motion data based on the first motion data and the regular interval.

An electronic device according to an example embodiment of the disclosure may include: a camera module including an optical image stabilization (OIS) actuator and an image sensor, at least one motion sensor, and at least one processor operatively connected to the camera module and the at least one motion sensor and including a kernel, an OIS micro controller unit (OIS MCU), and a hardware abstraction layer (HAL). The at least one processor is configured to: obtain, from the image sensor, a first image frame on which the OIS actuator performs image stabilization based on the electronic device shaking, the first image frame including a first marker based on a first timer of the kernel, obtain a first vertical synchronization signal corresponding to the first image frame, obtain a plurality of pieces of motion data of the electronic device via the at least one motion sensor while the first image frame is read out, identify first motion data corresponding to a first point in time at which the first image frame is completely read out based on the first vertical synchronization signal, and perform digital image stabilization (DIS) on the first image frame using at least one piece of second motion data obtained before the first motion data and the first motion data from among the plurality of pieces of motion data.

In an electronic device according to an example embodiment of the disclosure, the at least one processor may be configured to: obtain the first image frame via the kernel, and obtain the first vertical synchronization signal and the plurality of pieces of motion data via the OIS MCU.

In the electronic device according to an example embodiment of the disclosure, the at least one processor may be configured to: calculate a first time interval between a first marker included in the first image frame and a first vertical synchronization signal, and based on the first motion data, the at least one piece of second motion data, and data associated with the first time interval, obtain a first data package to be used for the digital image stabilization.

The electronic device according to an example embodiment of the disclosure may be configured to perform the digital image stabilization on the first image frame based on the first data package and the amount of stabilization performed on the first image frame by the OIS actuator.

In an electronic device according to an example embodiment of the disclosure, the OIS MCU included in the at least one processor may be configured to transfer, based on the first vertical synchronization signal, OIS data and gyro data to the HAL.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a camera module including an optical image stabilization (OIS) actuator and an image sensor configured to read out an image frame obtained based on image stabilization performed via the OIS actuator;
at least one motion sensor; and
at least one processor, comprising processing circuitry, operatively connected to the camera module and the at least one motion sensor and
configured, individually or collectively, to:
obtain a first image frame read out via the image sensor;
obtain, from the image sensor, a first vertical synchronization signal (Vsync) corresponding to an operation of the image sensor for obtaining the first image frame;
obtain a plurality of pieces of motion data corresponding to a-movement of the electronic device via the at least one motion sensor, while the first image frame is read out;
identify, based on the first vertical synchronization signal, first motion data corresponding to a first point in time at which read-out of the first image frame is completed;
calculate a first time interval between the first time point and the first vertical synchronization signal;
obtain a first data package for digital image stabilization (DIS) based on the first motion data, at least one piece of second motion data obtained before the first motion data among the plurality of pieces of motion data, and data associated with the first time interval; and
perform digital image stabilization on the first image frame using the first data package.

2. The electronic device of claim 1, wherein the first image frame comprises a first marker based on a first timer.

3. The electronic device of claim 1, wherein at least one processor is configured, individually or collectively, to perform, based on the first data package and an amount of stabilization performed on the first image frame by the OIS actuator, the digital image stabilization on the first image frame.

4. The electronic device of claim 1, wherein at least one processor is configured, individually or collectively, to reduce or remove the first time interval for a second image frame subsequent to the first image frame.

5. The electronic device of claim 2, wherein the first marker corresponds to the first time point.

6. The electronic device of claim 1, wherein the plurality of pieces of motion data are obtained at a regular interval, and at least one processor is configured, individually or collectively, to identify, based on the first motion data and the regular interval, the at least one piece of second motion data.

7. The electronic device of claim 1, wherein the at least one motion sensor comprises a gyro sensor, and
the plurality of pieces of motion data comprises at least one of gyro data or OIS data.

8. A method of operating an electronic device, the method comprising:
obtaining a first image frame read out via an image sensor;
obtaining, from the image sensor, a first vertical synchronization signal (Vsync) corresponding to an operation of the image sensor for obtaining the first image frame;
obtaining, by at least one motion sensor, a plurality of pieces of motion data corresponding to a-movement of the electronic device while the first image frame is read out;
identifying, based on the first vertical synchronization signal, first motion data corresponding to a first point in time at which read-out of the first image frame is completed;
calculating a first time interval between the first time point and the first vertical synchronization signal;
obtaining a first data package for digital image stabilization (DIS) based on the first motion data, at least one piece of second motion data obtained before the first motion data among the plurality of pieces of motion data, and data associated with the first time interval; and
performing digital image stabilization (DIS) on the first image frame using the first data package.

9. The method of claim 8, wherein the first image frame comprises a first marker based on a first timer.

10. The method of claim 8, further comprising, based on an amount of stabilization performed on the first image frame by an OIS actuator and the first data package, performing the digital image stabilization on the first image frame.

11. The method of claim 8, further comprising reducing or removing the first time interval for a second image frame subsequent to the first image frame.

12. The method of claim 9, wherein the first marker corresponds to the first time point.

13. The method of claim 8, further comprising:
obtaining the plurality of pieces of motion data at regular intervals; and
identifying, based on the first motion data and the regular interval, the at least one piece of second motion data.

14. One or more computer-readable storage media storing instructions which, when executed by at least one processor, cause an electronic device to perform operations comprising:
obtaining a first image frame read out via an image sensor;
obtaining, from the image sensor, a first vertical synchronization signal (Vsync) corresponding to an operation of the image sensor for obtaining the first image frame;
obtaining, by at least one motion sensor, a plurality of pieces of motion data corresponding to movement of the electronic device while the first image frame is read out;
identifying, based on the first vertical synchronization signal, first motion data corresponding to a first point in time at which read-out of the first image frame is completed;
calculating a first time interval between the first time point and the first vertical synchronization signal;
obtaining a first data package for digital image stabilization (DIS) based on the first motion data, at least one piece of second motion data obtained before the first motion data among the plurality of pieces of motion data, and data associated with the first time interval; and
performing digital image stabilization on the first image frame using the first data package.

* * * * *